United States Patent
Lee et al.

(10) Patent No.: US 9,798,946 B2
(45) Date of Patent: Oct. 24, 2017

(54) SYSTEMS AND METHODS FOR OPTICAL RECOGNITION OF TIRE SPECIFICATION

(71) Applicant: DAIN CO., LTD., Chungheongnam-do (KR)

(72) Inventors: Young Gi Lee, Chungcheongnam-do (KR); Kun Woo Lee, Seoul (KR); Seung Yeob Baek, Seoul (KR); Dong Uk Kam, Seoul (KR); Dae Wook Kim, Seoul (KR); Soo Gon Yoo, Seoul (KR)

(73) Assignee: DAIN CO., LTD., Chungcheongnam-ro (KR)

(*) Notice: Subject to any disclaimer, the term of this patent is extended or adjusted under 35 U.S.C. 154(b) by 0 days.

(21) Appl. No.: 14/941,313

(22) Filed: Nov. 13, 2015

(65) Prior Publication Data
US 2016/0224863 A1    Aug. 4, 2016

(30) Foreign Application Priority Data
Jan. 29, 2015   (KR) .................. 10-2015-0014598

(51) Int. Cl.
*G06K 9/00* (2006.01)
*G06K 9/32* (2006.01)
(Continued)

(52) U.S. Cl.
CPC ......... *G06K 9/3275* (2013.01); *G06K 9/2081* (2013.01); *G06K 2009/363* (2013.01); *G06K 2209/01* (2013.01)

(58) Field of Classification Search
CPC .... G06K 2209/01; G06K 9/3233; G06K 9/46; G06K 9/00536; G06T 7/11; H04N 1/00326
See application file for complete search history.

(56) References Cited

U.S. PATENT DOCUMENTS

| | | | | |
|---|---|---|---|---|
| 4,727,419 A | * | 2/1988 | Yamada | G06K 7/1092 382/141 |
| 8,548,201 B2 | * | 10/2013 | Yoon | G06K 9/3258 382/105 |
| 2012/0057756 A1 | | 3/2012 | Yoon et al. | |

FOREIGN PATENT DOCUMENTS

| | | | |
|---|---|---|---|
| JP | 2003/121111 | * | 4/2003 |
| JP | 134176 A | | 7/2013 |

(Continued)

OTHER PUBLICATIONS

Ikeda et al.; "Snow covered tire detector for vehicles, compares side view image of tire with prestored image, based on which usability of tire in winter is determined"; HTML version of JP 2003/121111; Apr. 2003.*

(Continued)

*Primary Examiner* — Eueng-Nan Yeh
(74) *Attorney, Agent, or Firm* — Kilpatrick Townsend & Stockton LLP

(57) ABSTRACT

Provided are a method and an apparatus for recognizing a tire by using an image of a tire captured by using a terminal. The apparatus recognizes a tire by converting an image of a round tire included in the image into a linear image, extracting an area of a character to be recognized from the linear image, and determining a character for learning, which is most similar to the extracted area of the character to be recognized from among a pre-constructed group of characters for learning, as a character in the area of the character to be recognized.

12 Claims, 31 Drawing Sheets

(51) Int. Cl.
*G06K 9/20* (2006.01)
*G06K 9/36* (2006.01)

(56) References Cited

FOREIGN PATENT DOCUMENTS

KR 10-0511004 B1 1/2001
KR 10-2012-0023485 A 3/2012

OTHER PUBLICATIONS

Korean Office Action corresponding to Korean Patent Application No. 2015-0014598, dated Jan. 29, 2015.

* cited by examiner

SYSTEMS AND METHODS FOR OPTICAL RECOGNITION OF TIRE SPECIFICATION

CROSS-REFERENCE TO RELATED APPLICATION

This application claims the benefit of Korean Patent Application No. 10-2015-0014598, filed on Jan. 29, 2015, in the Korean Intellectual Property Office, the disclosure of which is incorporated herein in its entirety by reference.

BACKGROUND

1. Field

One or more exemplary embodiments relate to a tire recognition method and system, and more particularly, to a method and an apparatus for recognizing a tire by analyzing a character in an image of a side of the tire which is captured by using an image obtaining apparatus such as a camera.

2. Description of the Related Art

Various information such as a manufacturer, a model name, a size, or a manufacture date of a tire is shown on a side of the tire as characters such as a letter, a number, a symbol, or the like, as shown in FIG. 30. However, since such information is coded, it may be difficult for a general person to obtain accurate information about the tire without prior information, only by using characters shown on the side of the tire.

As an example of a method of obtaining information about a tire, a method of attaching a radio frequency identification (RFID) tag to the tire is used. However, since a separate reader is needed to read an RFID tag attached to a tire, a general person may have a limit in obtaining information from the RFID tag.

SUMMARY

One or more exemplary embodiments include a method and an apparatus for recognizing a tire by analyzing an image of a tire captured by using a terminal that includes a camera, such as a smartphone.

One or more exemplary embodiments include a method and an apparatus for obtaining an image of a tire having a certain specification by using a guideline so as to easily recognize a tire.

Additional aspects will be set forth in part in the description which follows and, in part, will be apparent from the description, or may be learned by practice of the presented embodiments.

According to one or more exemplary embodiments, a tire recognition method includes: receiving an image; converting an image of a round tire included in the image into a linear image; extracting an area of a character to be recognized from the linear image; and determining a character for learning, which is most similar to the extracted area of the character to be recognized from among a pre-constructed group of characters for learning, as a character in the area of the character to be recognized.

According to one or more exemplary embodiments, a method of obtaining an image for tire recognition by using a terminal that includes a camera inside or outside includes displaying at least one guideline on a screen; displaying an image input via the camera on the screen; and transmitting an image, captured based on the guideline.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
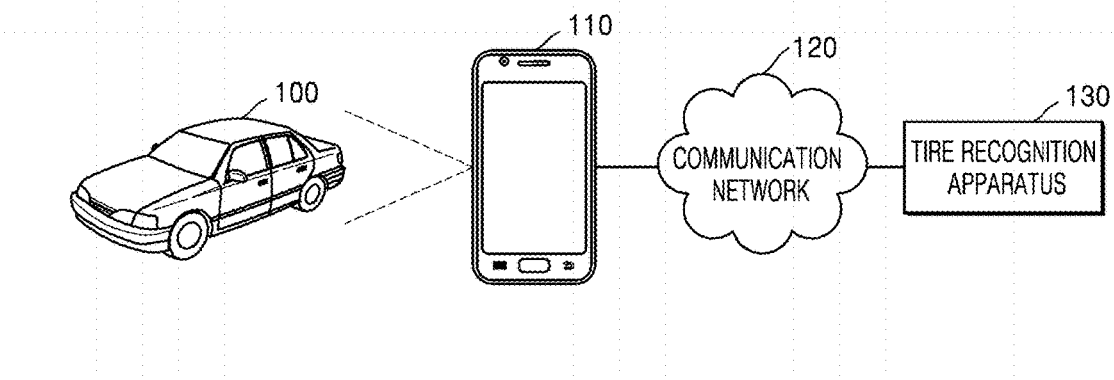
FIG. 1 illustrates a schematic structure of a whole system for recognizing a tire according to an exemplary embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the exemplary embodiments are merely described below, by referring to the figures, to explain aspects of the present description. Expressions such as "at least one of," when preceding a list of elements, modify the entire list of elements and do not modify the individual elements of the list Hereinafter, a tire recognition method and apparatus will be described in detail by explaining exemplary embodiments with reference to the attached drawings.

FIG. 1 illustrates a schematic structure of a whole system for recognizing a tire according to an exemplary embodiment.

Referring to FIG. 1, a user captures an image of a tire of a vehicle 100 by using a terminal 100. The terminal 110 may be a camera, or a terminal that includes a camera module inside or outside the terminal 110, such as a smartphone, a tablet personal computer (PC), or the like.

The terminal 110 and a tire recognition apparatus 130 are connected to each other, via a wired or wireless communication network 120. For example, if the terminal 110 is a smartphone, the terminal 110 may be connected to the tire recognition apparatus 130 via a mobile communication network such as long term evolution (LTE), $3^{rd}$ generation (3G), or the like. As another example, if the terminal 110 includes a short-range communication module such as a universal serial bus (USB) port, an infrared communication module, or a Bluetooth module, the terminal may be connected, via a USB port, to a third apparatus (not shown) that may be connected to an external network such as an Internet. An image of a tire captured by the terminal 110 may be transmitted to the tire recognition apparatus 130 via the third apparatus (not shown).

The tire recognition apparatus 130 recognizes characters located on a side of the tire by analyzing the image received from the terminal 110, determine tire information such as a manufacturer of the tire, a size of the tire, or the like, and then, provide and display the tire information on the terminal 110 so that a user may easily understand the tire information.

In the current embodiment, the tire recognition apparatus 130 and the terminal 110 are shown as separate elements. However, the tire recognition apparatus 130 may be implemented as software such as an application, stored in the terminal 110, and executed by the terminal 110.

Figure 2:
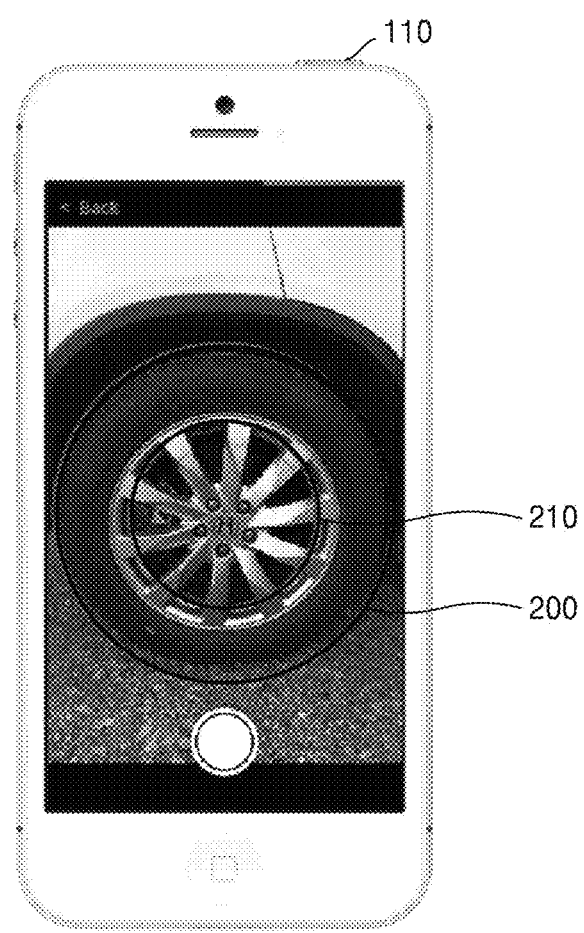
FIG. 2 illustrates an example of capturing an image of a tire by using a terminal, according to another exemplary embodiment.

FIG. 2 illustrates an example of capturing an image of a tire by using the terminal 110, according to other exemplary embodiments.

Referring to FIG. 2, an image to be captured by a camera is displayed on a screen of the terminal 110, and at least one first or second guideline 200 or 210 for supporting the capturing of an image of a tire is displayed on the screen of the terminal 110.

For example, the at least one guideline 200 or 210 may include a first guideline 200 corresponding to a whole tire or a second guidelines 210 corresponding to a wheel of the tire. The first and second guidelines 200 and 210 are in the form of circles or ovals having a different diameter from each other, and the second guideline 210 may be located inside the first guideline 200.

As another example, the at least one guidelines 200 or 210 may be variously modified such as having a form of a polygon such as a triangle, a rectangle, a pentagon, or the like, or having a form in which only a part of a line of a circle or a polygon is shown. Additionally, one or three or more guidelines that include the first guideline 200 and the second guideline 210 may be present.

A user may capture an image of a tire with reference to the guideline 200 or 201 displayed on a screen of the terminal 110. A shape of the at least one guideline 200 or 210 may be changed according to a distance between the terminal 110 and a subject or an angle at which an image of the tire is captured. This is described with reference to FIG. 3 or 4.

Figure 3:
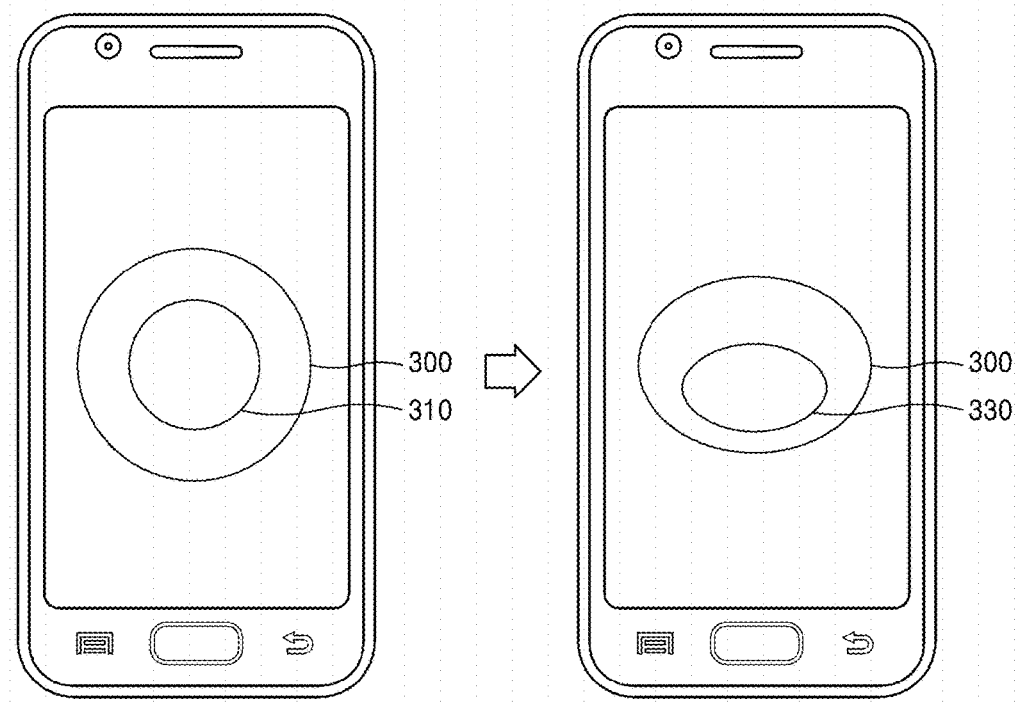
FIGS. 3 and 4 illustrate an example of a guideline whose shape is changed according to a photographing condition.
Figure 4:
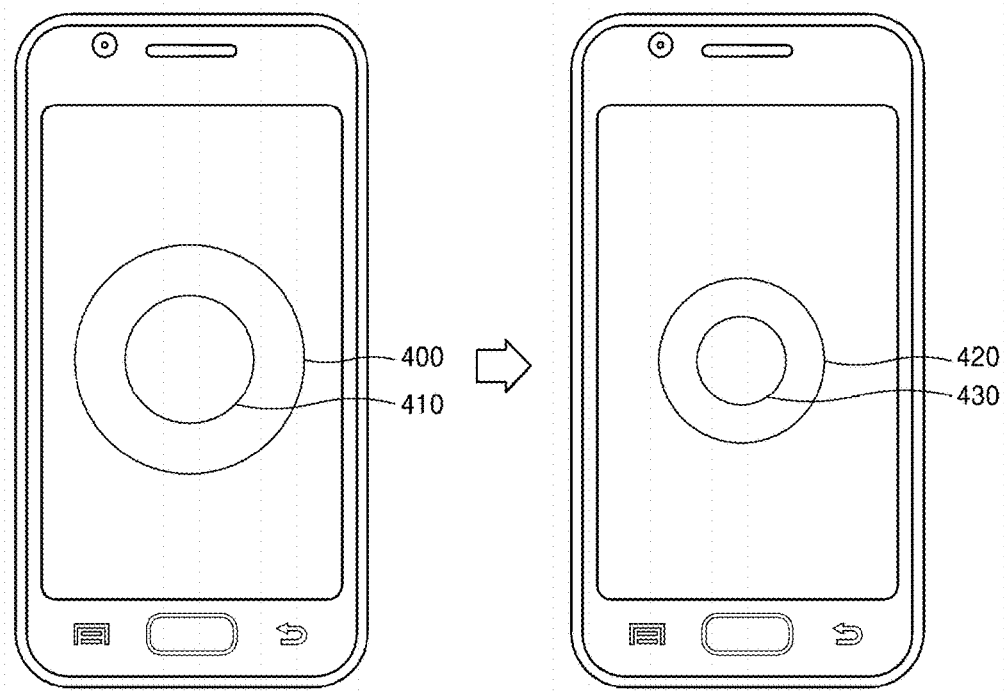

FIGS. 3 and 4 illustrate an example of a guideline whose shape is changed according to a photographing condition.

Referring to FIG. 3, a curvature of a guideline displayed on a screen of the terminal 110 is changed according to an angle at which a camera captures an image, that is, a degree to which the terminal is inclined. For example, if a user capture an image of a tire in front of the tire in correspondence with a height of the tire, an inclination of the terminal approximates to 0. In this case, a shape of guidelines 300 and 310 is a circle.

If the terminal 110 is inclined toward a front side such that a camera captures an image of the tire from an upward to a downward direction, since the image of the tire, captured by the camera, has an oval shape, a shape of guidelines is also changed to an oval shape of guidelines 320 and 330.

Referring to FIG. 4, if a distance between the terminal 110 and a tire, that is, a distance between the terminal 110 and a subject is short, a size of a subject is increased, and thus, sizes of guidelines 400 and 410 are also increased. If a distance between the terminal 110 and a tire is increased, sizes of guidelines 400 and 410 are also decreased.

As such, a guideline is displayed on the screen of the terminal 110 so that a curvature, a size, a location, or the like of the guideline is adaptively changed according to an angle at which the terminal 110 captures an image or a distance between the terminal 110 and a subject. In other words, since a shape of a tire in a captured image varies depending on a photographing condition such as a direction in which the terminal 110 captures an image of the tire, a distance between the terminal 110 and the tire, illumination, or the like, the terminal 110 controls a shape of a guideline according to a shape of the tire which varies according to the photographing condition.

In the current embodiment, changing of a shape of a guideline according to an angle at which the terminal captures an image and a distance between the terminal and a subject is described. However, exemplary embodiments are not limited thereto, and other various methods of changing a shape of a guideline according to photographing conditions may be employed.

Figure 5:
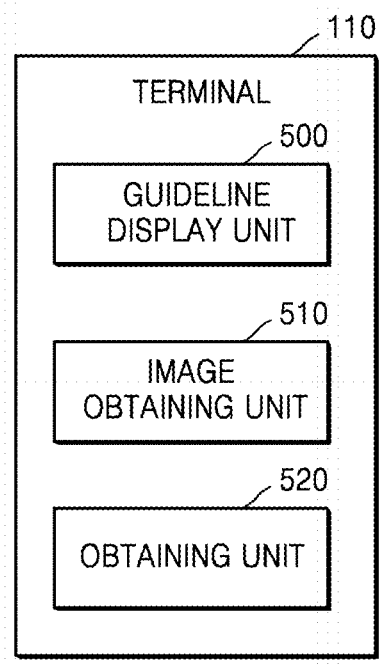
FIG. 5 is a block diagram of an example of the terminal 110 according to another exemplary embodiment

FIG. 5 is a block diagram of an example of the terminal 110 according to another exemplary embodiment.

Referring to FIG. 5, the terminal 110 includes a guideline display unit 500, an image obtaining unit 410, and a transmission unit 520.

The guideline display unit 550 displays a guideline for capturing an image of a tire on a screen. The guideline may have a shape of a circle or an oval whose curvature is changed according to an inclination of the terminal 110 or a distance between the terminal 110 and a subject that is the tire, but is not limited thereto.

The image obtaining unit 510 obtains an image of the tire via a camera. For example, as shown in FIG. 2, a user captures an image of the tire after matching the guidelines 200 and 210, shown as two ovals on a screen of the terminal 110, respectively with a wheel of the tire and an outer boundary of the tire.

The transmission unit 520 transmits an image of the tire, captured by the image obtaining unit 410, to a tire recognition apparatus directly or via a third apparatus. If the tire recognition apparatus is formed of an application and implemented to be included in the terminal 110, the transmission unit 520 may not be included in the terminal 110.

If a shape of a guideline is not adaptively changed according to a state of a terminal, but is fixed in a screen of the terminal 110, and the tire recognition apparatus already knows information about a location, a size, or the like of the guideline fixed in the terminal 110, the transmission unit 520 may not transmit the information about a location, a size, or the like of the guideline to the tire recognition apparatus.

However, if a shape of a guideline is changed according to a state of the terminal 110 or if the tire recognition apparatus does not have prior information about the guideline, the transmission unit 520 may transmit the information about a location, a size, or the like of the guideline and the captured image together to the tire recognition apparatus.

Figure 6:
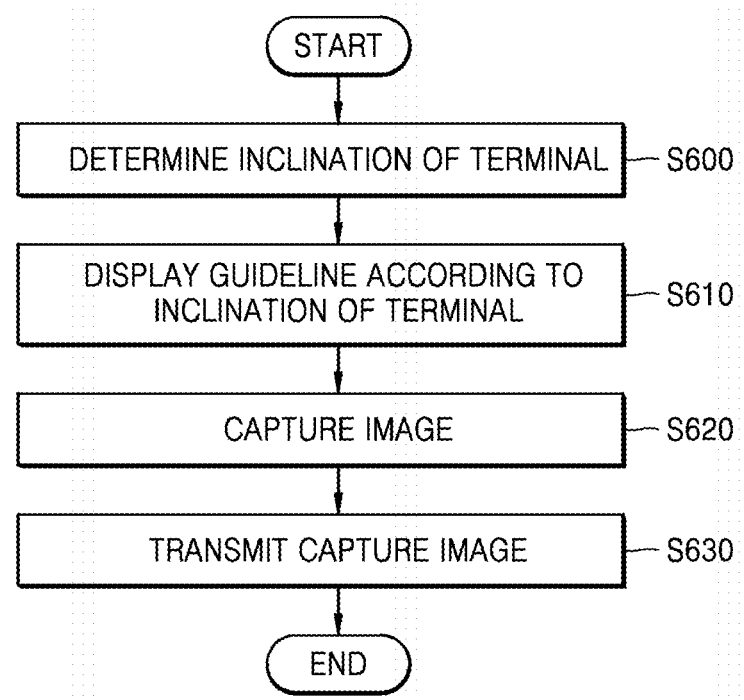
FIG. 6 is a flowchart of an example of a method of obtaining an image of a tire by using the terminal, according to another exemplary embodiment.

FIG. 6 is a flowchart of an example of a method of obtaining an image of a tire by using the terminal 110, according to another exemplary embodiment.

Referring to FIG. 6, in operation S600, the terminal 110 may determine an angle at which the terminal captures an image, a distance between the terminal and a subject, or the like. An angle at which the terminal captures an image may be determined by determining an inclination of the terminal 110 by using various sensors that may detect an inclination, such as a gyroscope sensor included in in the terminal 110. A distance between the terminal 110 and the subject may be determined by using an automatic focusing algorithm or various types of distance measuring sensor.

In operation S610, the terminal controls and displays a size, a curvature, or a location of a guideline displayed on a screen, according to the angle at which the terminal captures an image, the distance between the terminal and the subject, or the like. According to exemplary embodiments, the guideline may not be changed, but fixed according to a state of the terminal 110.

In operation S620, the terminal captures an image of a tire by using the camera. A user may capture an image of the tire by corresponding the guideline displayed on the screen to the tire, so that the tire recognition apparatus may easily identify and analyze the tire.

In operation S630, the terminal 110 transmits the captured image to the tire recognition apparatus directly or via a third apparatus. If a shape, a size, or a curvature of the guideline is adaptively changed according to a state of the terminal 110, the transmission unit 520 may transmit the information about a location, a size, or the like of the guideline and the captured image together to the tire recognition apparatus.

Figure 7:
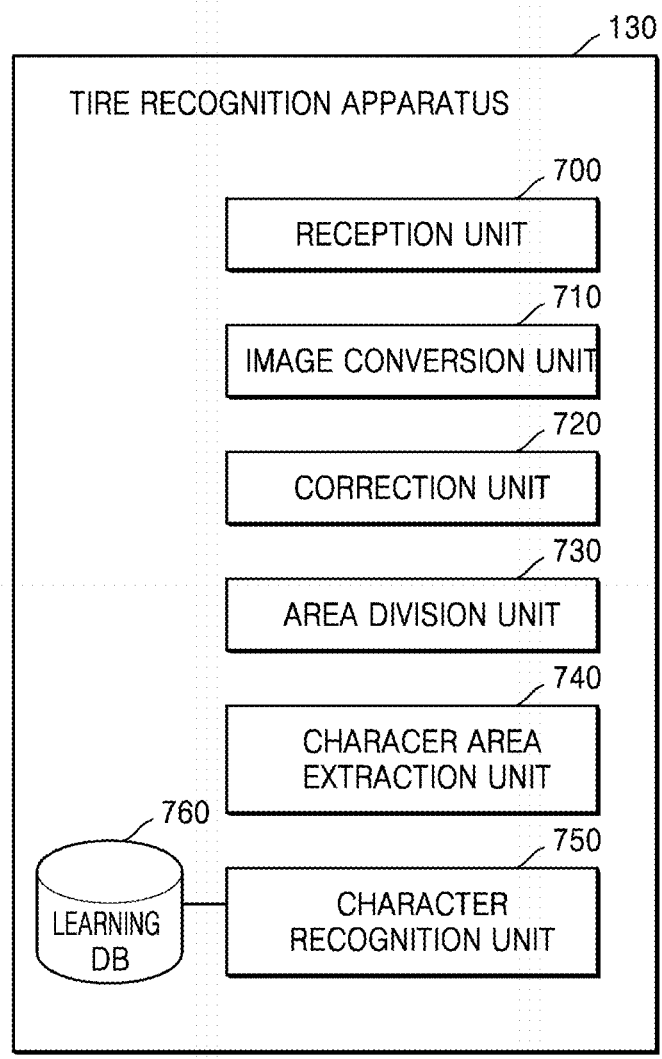
FIG. 7 is a block diagram of an embodiment of the tire recognition apparatus 130 according to another exemplary embodiment.

FIG. 7 is a block diagram of an embodiment of the tire recognition apparatus 130 according to another exemplary embodiment.

Referring to FIG. 7, the tire recognition apparatus 130 includes a reception unit 700, an image conversion unit 710, a correction unit 720, an area division unit 730, a character area extraction unit 740, a character recognition unit 750, and a learning database 760.

The reception unit 700 receives an image. The reception unit 700 may receive an image, captured by the terminal 100 described with reference to FIG. 5, directly from the terminal 100 or via a third apparatus. As another example, if the tire recognition apparatus 130 is implemented as an application and included in the terminal 100, the reception unit 700 may not be included in the tire recognition apparatus 130.

The image conversion unit 710 converts an image of a circle tire in the received image into a linear image. In detail, the image conversion unit 710 may estimate a boundary between a wheel and the tire by taking into account that a boundary between the wheel and the tire in the image is clear, extract the tire other than the wheel by using the estimated boundary between the wheel and the tire, and convert an image of the extracted tire into a linear image. The image conversion unit 710 may perform various image processing such as histogram equalization on the linear image so as to obtain a clear image.

In the current embodiment, a case when an image of a tire other than a wheel is converted into a linear image is described. However, exemplary embodiments are not limited thereto, and an image of a whole tire may be converted into a linear image without having to remove a wheel from the tire, or an image of a tire that includes a part of a wheel may be converted into a linear image.

However, hereinafter, a case when an image of a tire which does not include a wheel is converted into a linear image is described.

Figure 8:
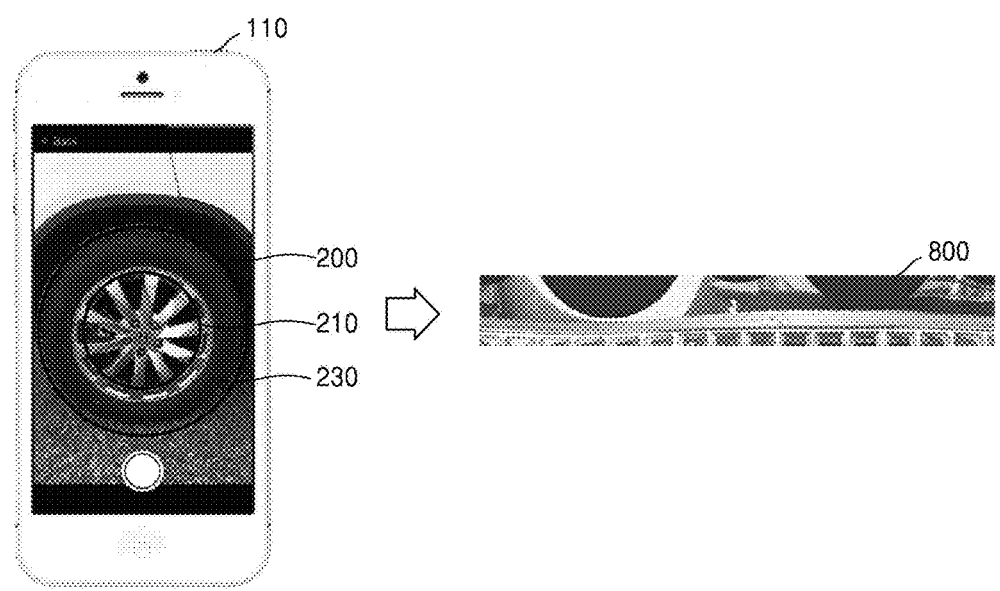
FIGS. 8 and 9 illustrate an example of a method of converting an image of a round tire into a linear image according to another exemplary embodiment.

As an example, referring to FIG. 8, the image conversion unit 710 may extract a tire 230 located between the two guidelines 200 and 210 having a shape of a circle and convert an image of the tire 230 into a linear image. A method described with reference to FIG. 9 may be applied to the converting of the image of the tire 230 into the linear image. However, exemplary embodiments are not limited to the method described with reference to FIG. 9, and various image processing methods in a related art may be used to convert an image of a round tire to a linear image.

Figure 15:
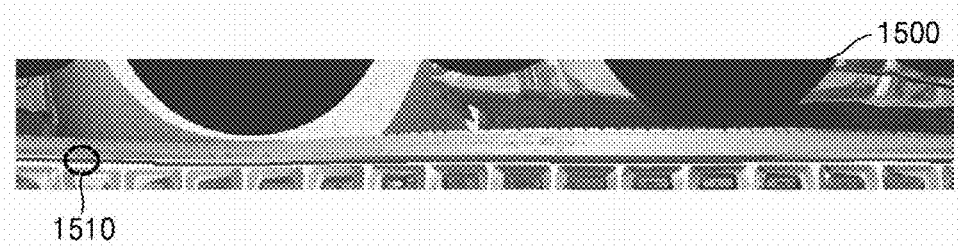
Figure 16:
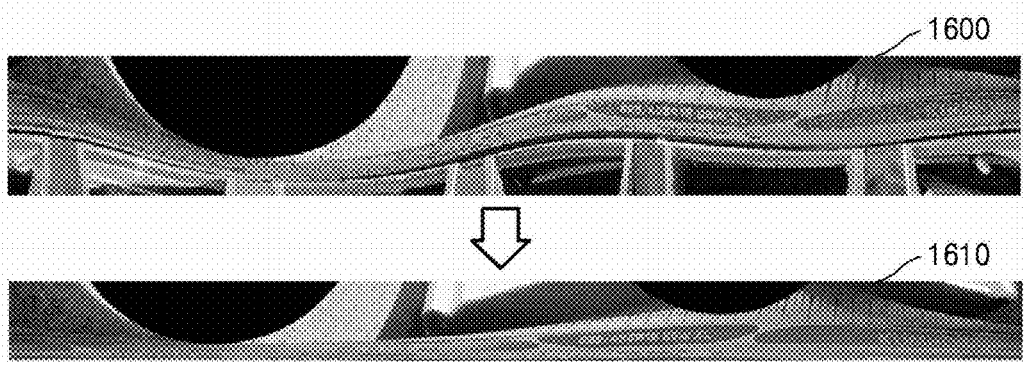

If a tire is extracted by using the guidelines 200 and 210, since a certain part of a wheel is extracted together with the tire and the image of the tire is not properly flattened to obtain a linear image as shown in an upper drawing 1600 in FIG. 16, a correction process of accurately removing the wheel and properly flattening the image of the tire as shown in a lower linear image 1610 in FIG. 15 may be performed. The correction process is performed by the correction unit 720. The correction unit 720 may not be included in the tire recognition apparatus 130 according to exemplary embodiments.

The correction unit 720 generates a linear image by correcting the boundary between the wheel and the tire, the boundary being is used by the image conversion unit 710 to obtain a linear image, and then, re-extracting an image of the tire from the whole image based on the corrected boundary.

For example, the correction unit 720 determines a boundary between the wheel and the tire based on intensity of a linear image which is generated by the image conversion unit 720. The boundary between the wheel and the tire is generally located on a line in a horizontal direction in the linear image. Accordingly, the correction unit 720 obtains boundaries with respect to a plurality of areas of the linear image which are divided based on the intensity, and obtains a shortest path connecting both ends of an image of a path in the form of a maze, consisting of the boundaries, to each other, in consideration of a weight value according to directions of the boundaries. The calculated shortest path corresponds to a boundary between a tire and a wheel. The shortest path does not simply refer to a path having a shortest distance, but a shortest path obtained in consideration of a weight value. For example, if a length of a first path is 10 and a weight value for the first path is 0.8, and a length of a second path is 11 and a weight value for the second path is 0.5, a length of the first path which is obtained in consideration of the weight value is 10×0.8=8, and a length of the second path which is obtained in consideration of a weight value is 11×0.5=5.5. Thus, the second path is selected as the shortest path. This is described in detail with reference to FIGS. 10 and 11.

The area division unit 730 divides the linear image into at least one area by using a material, a pattern, or an edge. For example, since a tread area, an area in which a big character is present, and an area in which a small character is present are included in a side of the tire and respectively have a different state such as having a material or a pattern different from each other, the area division unit 730 extracts boundaries between the areas, having states different from each other, from the linear image, and divides the linear image into each area. Various methods of dividing an image into each area may be employed, and an example thereof is described with reference to FIGS. 17 through 22. In the current embodiment, the area division unit 730 for dividing a linear image into one or more areas that respectively include characters is provided to easily extract an area of a character from the linear image. However, the area division unit 730 may not be included in the tire recognition apparatus 130.

The character area extraction unit 740 extracts an area of a character to be recognized, in which a character is present, from the areas obtained by the dividing by the area division unit 730. As another example, if the area division unit 730 is not included in the tire recognition apparatus 130, the character area extraction unit 740 extracts an area of a character to be recognized, in which a character are present, from the whole linear image. Here, a character refers to an alphabet, a Hangul character, a number, a symbol, an image, or the like.

Figure 23A:
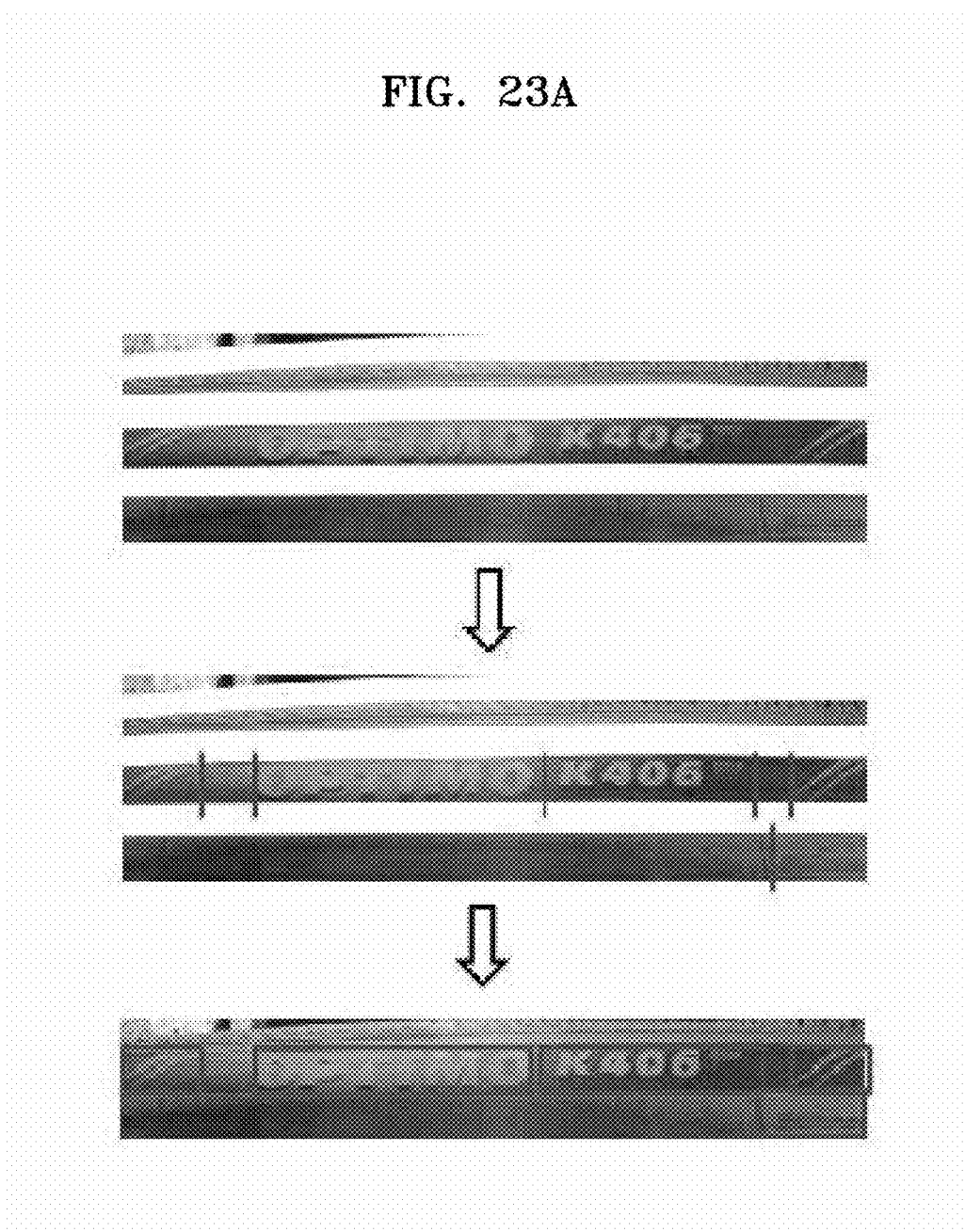
FIG. 23A illustrates an example of a method of extracting a character area from the image divided according to areas.
Figure 23B:
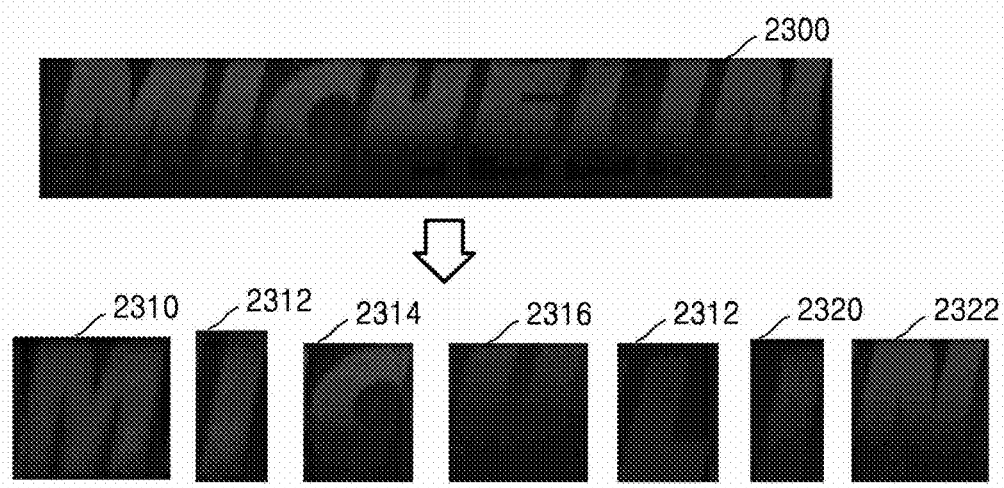
FIG. 23B illustrates an example of a method of extracting an image area according to each character in a character area.

The character area extraction unit 740 extracts an area of a character to be recognized, in which a character is present, by using various image analysis methods such as intensity analysis, histogram analysis, edge analysis, or the like, by taking into account that an area in which character is present includes more edges compared to other background areas. Here, the area of a character to be recognized is not a character, but a certain area that includes a character. For example, as shown in FIGS. 23A and 23B, the character area extraction unit 740 primarily extracts an area 2300 that includes a plurality of characters, and then, extracts each area of a character, as an area of a character to be recognized, from the primarily extracted area 2300.

The character recognition unit 750 identifies a character that is present in each area of a character to be recognized, which is extracted by the character area extraction unit 740. Since black and white are not clearly distinguished from each other in a character in an image of a tire and a background in a periphery of the tire, it may be difficult to recognize a character by using a general image recognition method. Accordingly, the text recognition unit 750 constructs a learning database 760 that includes feature information about a group of characters to be learned in advance, and then, identifies a character in an area of a character to be recognized, by comparing a character in each area of a character to be recognized, extracted by the character area extraction unit 740, to a character in the learning database 760 which is most similar to the character in each area of a character to be recognized.

The tire recognition apparatus 130 separates an area for learning that includes each character from a captured image of a tire, and constructs the learning database 760 in which at least one piece of feature information, obtained by applying at least one filter to each area for learning, and character information about an area for learning which corresponds to the at least one piece of the feature information are stored. For example, the tire recognition apparatus 130 extracts an image area, which has a certain size and includes a character for learning "M", from an image of a side of a tire. Then, the tire recognition apparatus 130 stores at least one piece of feature information, obtained by applying a filter to the image area, in the learning database 760. Accordingly, if feature information about an area of a character to be recognized, extracted by the character area extraction unit 740, is most similar to feature information about the character for learning "M" pre-stored in the learning database 760, the character recognition unit 750 determines that a character that is present in the extracted area of a character to be recognized is 'M'. An example of a method of recognizing a character, based on comparison between feature information by using a filter, is described with reference to FIG. 24.

Figure 9:
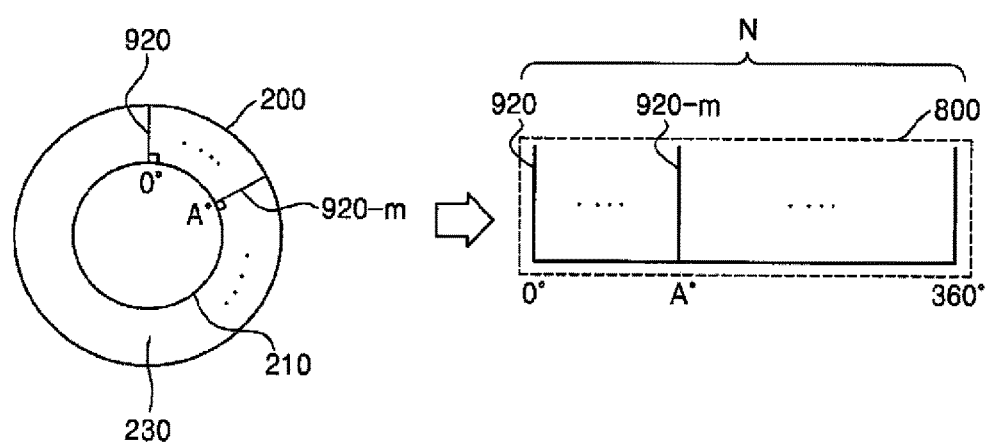

FIGS. 8 and 9 illustrate an example of a method of converting an image of a round tire into a linear image.

Referring to FIGS. 8 and 9, the tire recognition apparatus 130 converts a round image 230 of a tire located between the first and second guidelines 200 and 210, which is provided when an image of the tire is captured, into a linear image 800 of the tire. The tire recognition apparatus 130 generates the linear image 800 of the tire by rearranging linear images 920 through 920-$m$ in one direction, the linear images 920 through 920-$m$ being corresponding to a certain number of lines (for example, N lines) disposed to be perpendicular to a circumference of the second guideline 210 that corresponds to an area of a wheel.

For example, N lines perpendicular to the circumference of the second guideline 210, having a round shape, are set in correspondence with 0 to 360 degrees on the circumference. Then, the linear images 920 through 920-$m$, which consist of pixels of the image 230 of the extracted tire and correspond to the N lines, are sequentially disposed in a same direction. In other words, a first linear image 920 at 0 degree and an mth linear image 920-$m$ at a degree of A are disposed on a same line in a same direction as shown in FIG. 9.

FIGS. 10 through 16 illustrate examples of a method of correcting a linear image.

Figure 10:
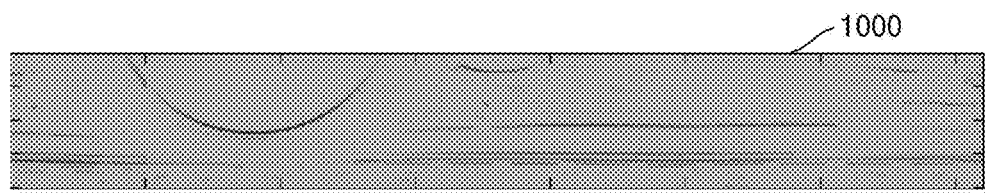
FIGS. 10 through 16 illustrate examples of a method of correcting a linear image.

Referring to FIG. 10, the tire recognition apparatus 130 applies a direction filter for providing a weight value to a linear image according to a direction. Referring to FIG. 8, since a boundary between the tire and the wheel in the linear image 800 is close to a horizontal direction, that is, a direction at 0 degree, the tire recognition apparatus 130 applies the direction filter in a direction at 0 degree to the linear image 800, so as to provide a great weight value to a horizontal direction. FIG. 10 shows the image 1000 in which a magnitude of a weight value is expressed in a color.

For example, the tire recognition apparatus 130 provides a weight value of 1 to lines shown in the linear image in a direction at 0 degree (or 360 degrees), provides a weight value of 0 to the lines in a direction at 90 degrees (or 180 degrees), and provides a weight value ranged between 0 and 1 to lines between 0 degree and 90 degrees, according to degrees.

Figure 11:
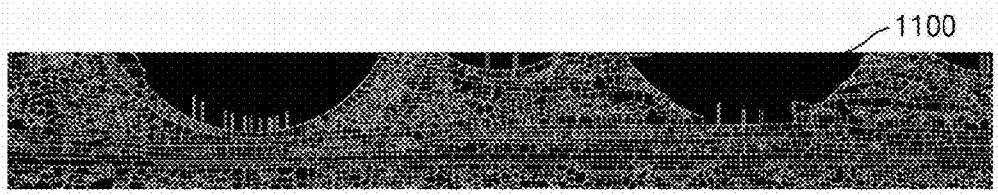

Referring to FIG. 11, the tire recognition apparatus 130 obtains a boundary between areas obtained by dividing a linear image based on intensity. For example, referring to FIG. 13, a drawing 1300, which consists of pixels of the linear image shown according to a magnitude of intensity of the pixels, includes three ridges 1310 through 1330 between areas. The tire recognition apparatus 130 obtains a path image 1100 in the form of a complex maze that includes boundaries consisting of the ridges 1310 through 1330. The tire recognition apparatus 130 may employ a watershed algorithm as an example of an algorithm for determining a ridge that is obtained based on intensity.

Figure 12:
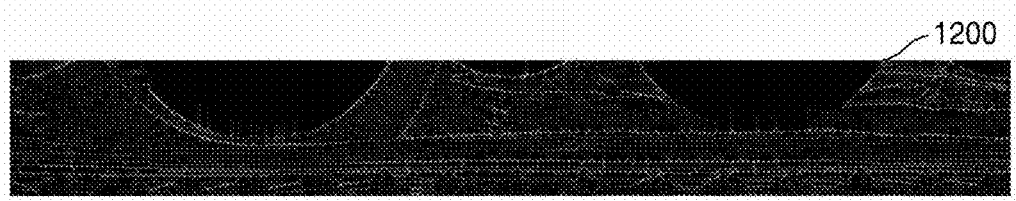

Referring to FIG. 12, the tire recognition apparatus 130 obtains an image 1200, shown in FIG. 12, by reflecting a weight value with respect to the linear image shown in FIG. 10 in the path image 1100 shown in FIG. 11. Then, the tire recognition apparatus obtains a shortest path connecting both ends of the image 1200 to each other, based on the reflection of a weight value in the image 1200. For example, the tire recognition apparatus 130 may obtain the image 1200 by combining the image 1000 shown in FIG. 10 with the path image 1100 shown in FIG. 11.

Figure 14:
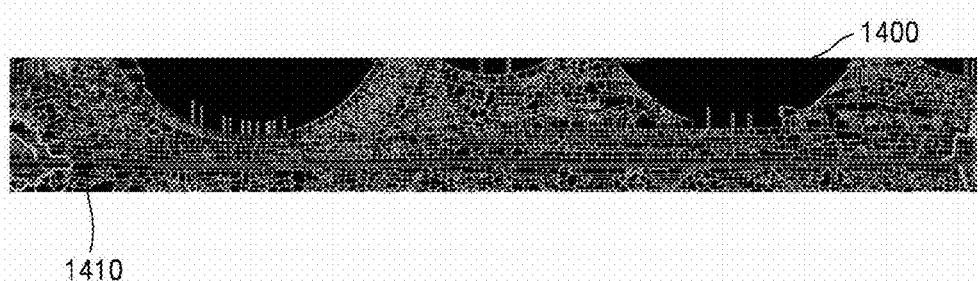

Referring to FIG. 14, since a linear image is obtained by flattening an image of a round tire, and thus, a right end of the linear image corresponds to a left end of the linear image, the tire recognition apparatus 130 determines a path connecting the right end to the left end by using various path search algorithms, by taking into account that a starting point of the left end is identical to an end point of the right end. The tire recognition apparatus 130 obtains a path 1410 that may be most easily passed, by determining a path having a high weight value as a path that may be easily reached.

Referring to FIG. 15, the tire recognition apparatus 130 applies the path 1410, obtained in FIG. 14, to the linear image 800 shown in FIG. 8. However, in a case of the path 1400 shown in FIG. 14, a phenomenon such as occurrence of stairs may occur due to a smoothing effect caused by the direction filter shown described with reference to FIG. 10. Such phenomenon is shown in a path 1510 in FIG. 15.

In this case, the tire recognition apparatus 130 may further perform a process of removing the phenomenon such as occurrence of stairs from the path 1510 and correcting the path 1510 to a smooth line. For example, the tire recognition apparatus 130 removes the phenomenon such as occurrence of stairs from the path 1510 by applying an active contour model, in which elasticity of each pixel and a gradient force in an external image are taken into consideration, to the path 1510. Additionally, since a boundary between a wheel and a tire which is shown in an actual tire image has a circular or oval shape, the tire recognition apparatus 130 converts the linear image 1500 into a round image, and then, corrects the path 1510 to have a circular or oval shape.

Referring to FIG. 16, in a case of the path 1510 representing a boundary between a tire and a wheel shown in FIG. 12 or if the phenomenon such as occurrence of stairs occurs as shown in FIG. 15, the tire recognition apparatus re-applies a path, obtained by correcting the path 1510, to a received image, extracts an image of the tire other than a wheel, and then, convers the extracted image of the tire into the linear image 1610. It may be understood that a tire is more accurately distinguished in the linear image 1610 obtained after the boundary between the tire and the wheel is corrected, than in the linear image 1600 obtained before the boundary is corrected.

FIGS. 17 through 21 illustrate examples of a method of dividing a linear image into areas.

Figure 17:
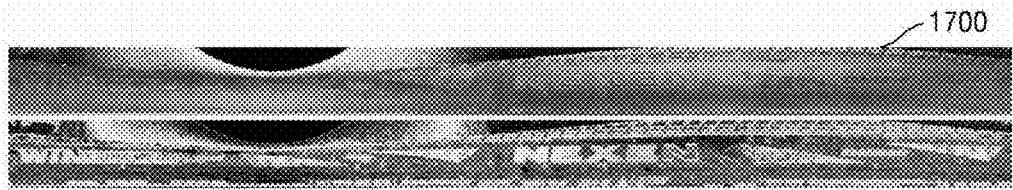
FIGS. 17 through 21 illustrate examples of a method of dividing a linear image according to areas.

Referring to FIG. 17, the tire recognition apparatus 130 increases a difference between a character area and other areas by applying an entropy filter to a linear image 1700, by taking into account that a degree of complexity is great in a periphery of a character area and in an area where a pattern is present, and that a degree of complexity is small in an area where a pattern or a feature is not present.

Figure 18:
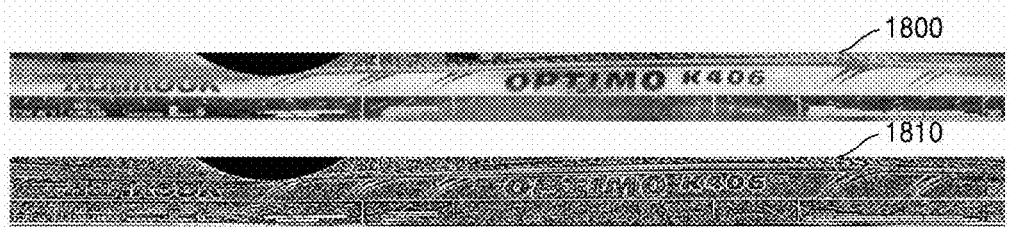

Referring to FIG. 18, the tire recognition apparatus 130 convers a linear image 1800 into a binary image 1810 in black and white. As an example, the tire recognition apparatus 130 may convert the linear image 1800 into the binary image 1810 by using an adaptive threshold. In this case, the tire recognition apparatus 130 may obtain the binary image 1810 consisting of black and white, by determining a pixel in a kernel consisting of a predetermined number of pixels (for example, 3×3 pixels) as white if intensity of a center pixel in the kernel is greater than a threshold value that is adaptively changed according to a deviation of a pixel value in the kernel, and determining a pixel in the kernel as black if the intensity of the center pixel is less than the threshold value.

Figure 19:

Referring to FIG. 19, the tire recognition apparatus 130 obtains an image 1900 shown in FIG. 19, by removing a noise area of the binary image 1810 shown in FIG. 18. For example, the tire recognition apparatus 130 may obtain an image 1900 shown in FIG. 19, by removing a white area whose size is smaller than a predetermined size from the binary image 1810 shown in FIG. 18.

Figure 20:

Referring to FIG. 20, the tire recognition apparatus 130 applies a shortest-path algorithm to a binary image 2000 from which noise is removed, and thus, obtains at least one path 2010 or 2020 which cross both ends of the binary image 2000.

Figure 21:
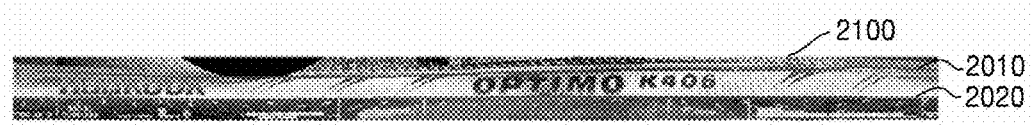

Referring to FIG. 21, the tire recognition apparatus 130 applies the at least one path 2010 or 2020, obtained with reference to FIG. 20, to a linear image 2100, and thus, divides the linear image 2100 into a tread area, an area where a big character is present, and an area where a small character is present.

Figure 22:
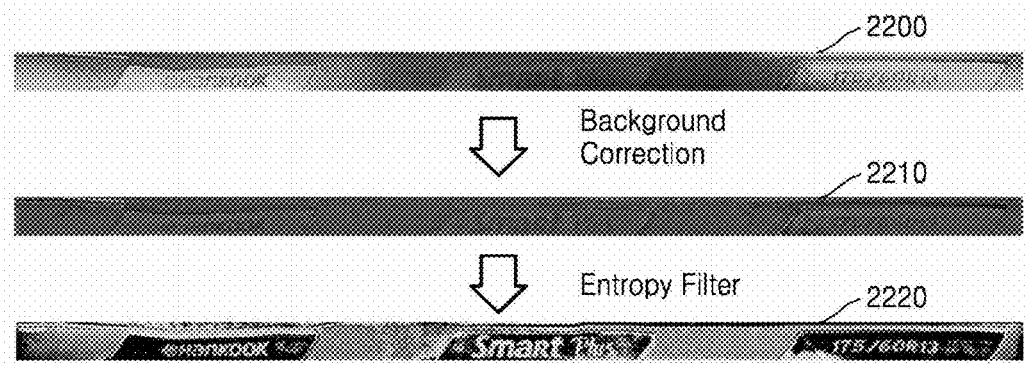
FIG. 22 illustrates an example of a method of correcting the image divided according to areas.

FIG. 22 illustrates an example of a method of correcting an image divided into areas, according to an exemplary embodiment.

Referring to FIG. 22, the tire recognition apparatus 130 performs a process of correcting a background, such as removing an effect of an external light source, so as to clearly distinguish a character area in an image 2200 of each area obtained by the dividing, from remaining areas in the image 2200. For example, the tire recognition apparatus 130 sequentially obtains images 2210 and 2220 by applying image processing, such as motion blurring or entropy filtering, to the image 2200 of each area obtained by the dividing.

FIG. 23A illustrates an example of a method of extracting a character area from an image divided according to areas, according to an exemplary embodiment. FIG. 23B illustrates an example of a method of extracting an image area in the units of a character in an area of characters, according to an exemplary embodiment.

Referring to FIG. 23A, since many edges are present in a periphery of a character, the tire recognition apparatus 130 may extract each character area from an image, based on a feature point obtained based on the edges.

Referring to FIG. 23B, the tire recognition apparatus 130 extracts at least one word included in each area of characters in the units of each character.

Figure 24:
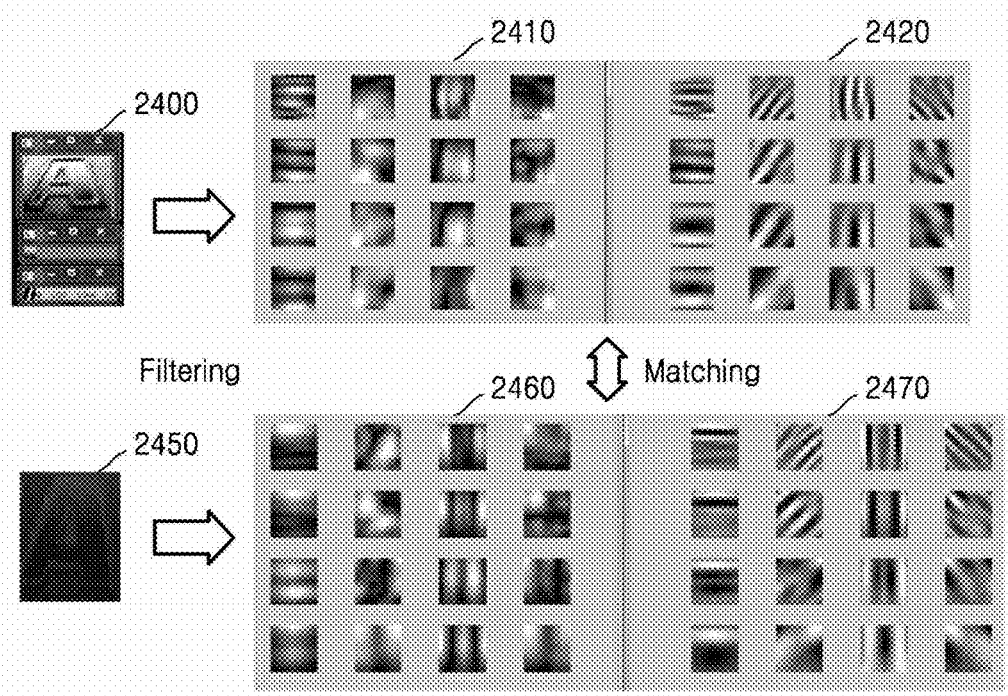
FIG. 24 illustrates an example of a method of comparing characters with each other for tire character recognition.

FIG. 24 illustrates an example of a method of comparing characters to each other for tire character recognition.

Referring to FIG. 24, a character area, located in an image of a side of a tire, is separated as an area 2400 for learning in advance when the system is constructed, and at least one piece of feature information 2410 or 2420, obtained by applying a filter to the area 2400 for learning, is stored in a learning database. Here, a gabor filter or a Haar-like filter may be employed as a filter.

For example, the tire recognition apparatus 130 extracts an area 2450 of a character to be recognized, which includes 'A', by analyzing a tire image received from the terminal 110, and obtains at least one piece of feature information 2410 or 2420 by applying at least one filter to the extracted area 2450 of a character to be recognized. The tire recognition apparatus compares feature information 2460 and 2470 about the area 2450 of a character for recognition to feature information pre-constructed in a learning database for each character for learning, and thus, determines a character 'A' for learning having the at least one piece of feature information 2410 or 2420 that is most similar to the feature information 2460 or 2470.

Figure 25:
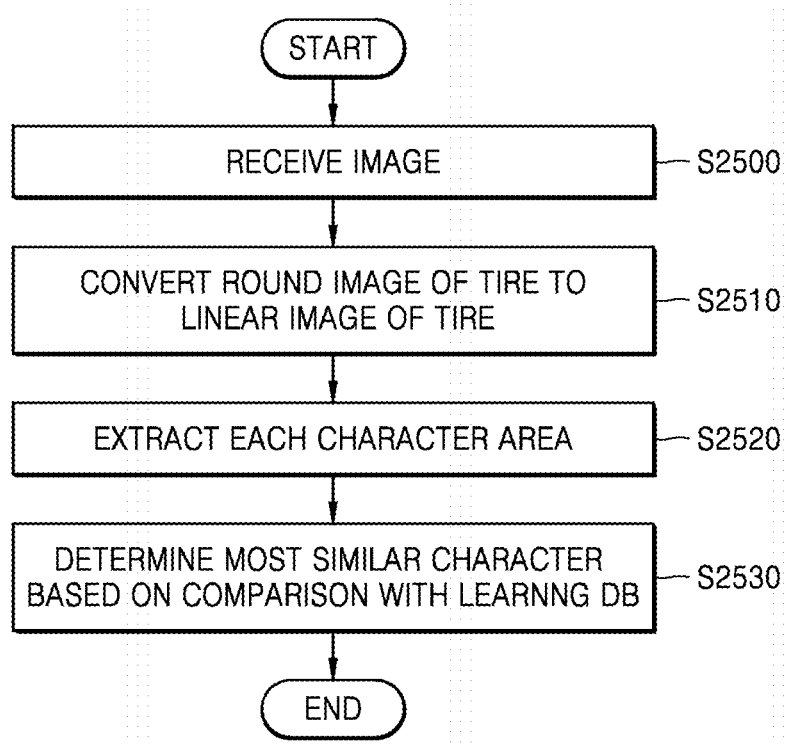
FIG. 25 illustrates a flowchart of an example of a tire recognition method.

FIG. 25 illustrates a flowchart of an example of a tire recognition method.

Referring to FIG. 25, in operation S2500, the tire recognition apparatus 130 receives an image. In operation S2510, the tire recognition apparatus 130 converts an image of a tire included in the received image into a linear image. The tire image apparatus 130 may convert only an image of a tire, from which a wheel is removed, into a linear image, or convert an image of a tire that includes the wheel into a linear image. The tire recognition apparatus 130 may use a guideline provided when the received image was captured or use a boundary between the wheel and the tire which is obtained by employing various image processing methods, so as to remove the wheel from the tire.

In operation S2520, the tire recognition apparatus 130 extracts each character area from the linear image by using a pattern, texture, an edge, or the like in the linear image. The tire recognition apparatus 130 may divide the linear image into one or more areas, and then, extract an area of a character to be recognized, which includes a character present in each area, from each area. The tire recognition apparatus 130 may perform various image processing, such as motion blurring or entropy filtering, so as to extract a clear character area from each area.

In operation S2530, the tire recognition apparatus 130 compares the area for a character to be recognized to a learning database so as to identify a character in the area of a character to be recognized. The learning database stores at least one piece of feature information obtained by applying various filters to each character area that is present in an image of a side of the tire. Then, the tire recognition apparatus 130 recognizes the extracted character, by searching for a character for learning, which has feature information most similar to the at least one feature information obtained by applying a filter to the extracted area of a character to be recognized, in the learning database.

The tire recognition apparatus 130 recognizes each character present in the image of the tire, identifies tire information, such as a type or a sizes of the tire, or the like, with reference to a database in which the tire information is stored, and then, provide the identified tire information to a terminal.

Figure 26:
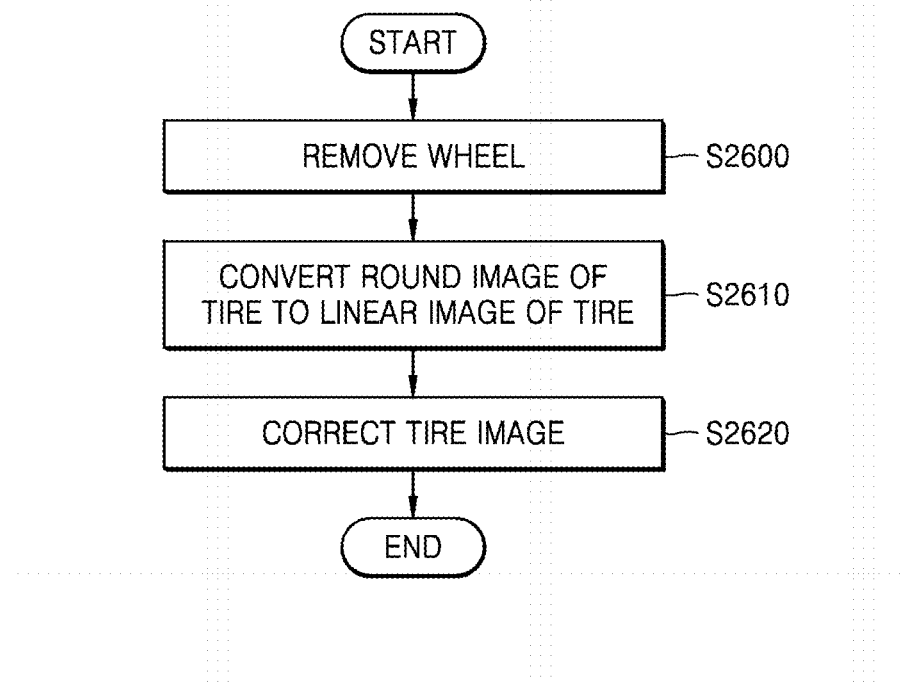
FIG. 26 is a flowchart of an example of a process of converting an image into a linear image.

FIG. 26 is a flowchart of an example of a process of converting an image into a linear image.

Referring to FIG. 26, in operation S2600, the tire recognition apparatus 130 removes a wheel from a tire in an image. The tire recognition apparatus 130 may employ a guideline provided when the image is captured so as to remove the wheel from the tire.

In operation S2610, the tire recognition apparatus 130 converts an image of a round tire included in the image, from which a wheel is removed, into a linear image. Various methods of converting a round image into a linear image may be present. However, in the current embodiment, the method described with reference to FIG. 9 may be applied to the converting.

If a guideline is employed to convert an image into a linear image, a certain part of a wheel may be included in the linear image. Accordingly, in operation S2620, the tire recognition apparatus 130 may perform a correction process of extracting a boundary between the tire and the wheel from the linear image so as to accurately remove a wheel, re-extracting the tire from the image by using the boundary between the wheel and the tire, and then, converting the image of the re-extracted tire into a linear image. A detail description about the correction process is provided with reference to FIG. 27.

Figure 27:
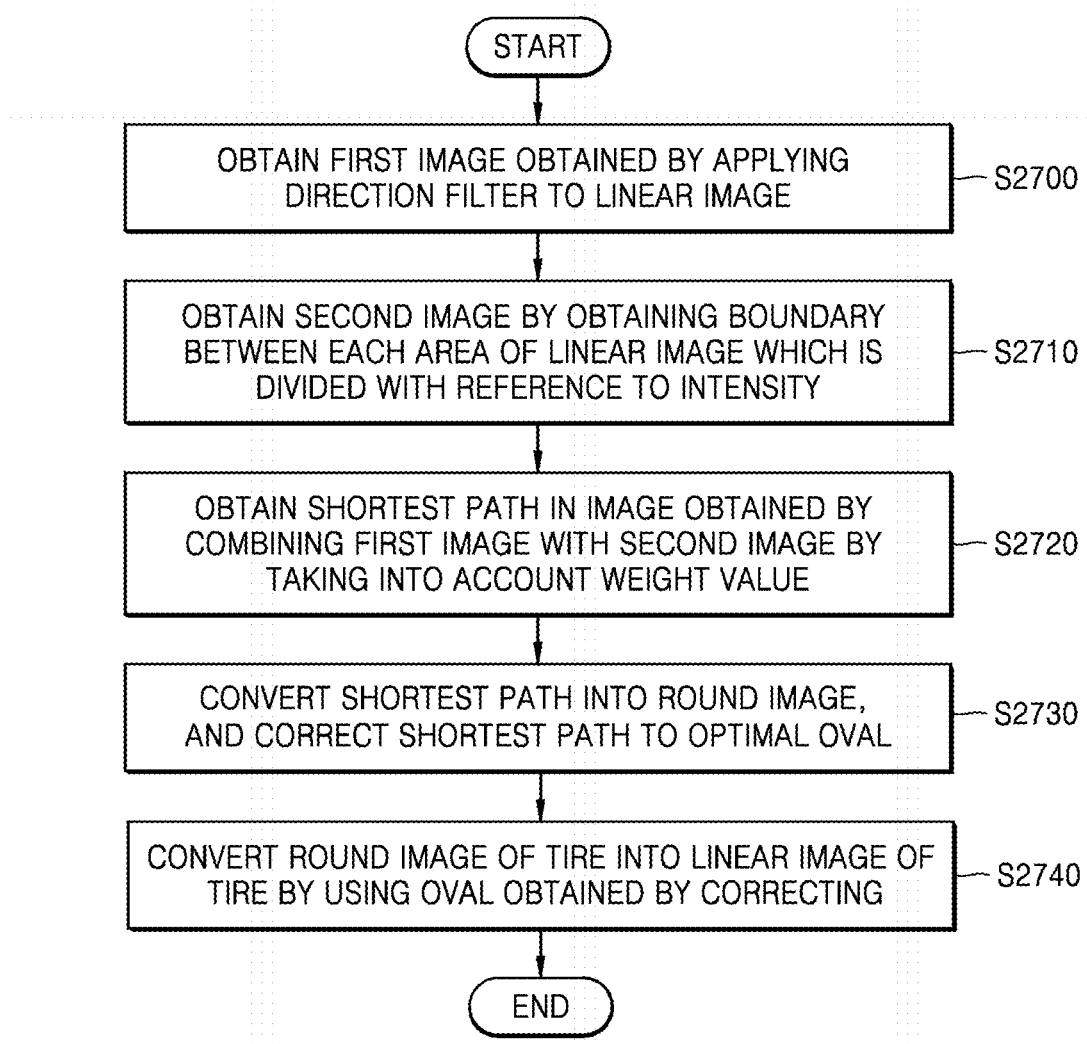
FIG. 27 is a flowchart of an example of a process of correcting a linear image.

FIG. 27 is a flowchart of an example of a process of correcting a linear image.

Referring to FIG. 27, in operation S2700, the tire recognition apparatus 130 obtains a first image 1000 obtained by applying a direction filter to the linear image 800. Since the boundary between the tire and the wheel in the linear image 800, shown in FIG. 8, is close to a horizontal direction, the tire recognition apparatus 130 obtains the first image 1000 shown in FIG. 10 by applying the direction filter, which provides a great weight value when the boundary is close to a direction at 0 degree, to the linear image 800.

Figure 13:
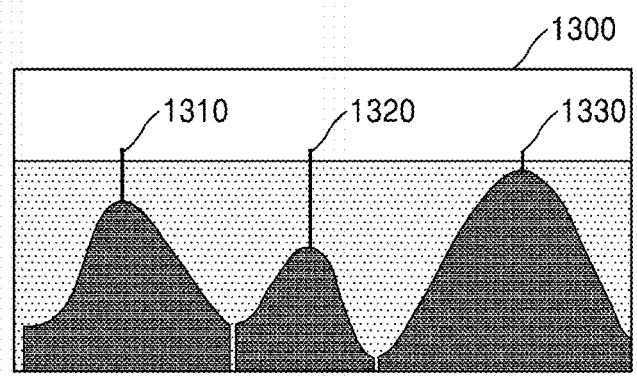

In operation S2710, the tire recognition apparatus 130 obtains the second image 1100, by obtaining a boundary between each area of the linear image which is divided with reference to intensity. The ridges 1310 through 1330, shown in FIG. 13, are formed based on a magnitude of the intensity in the linear image. Thus, the tire recognition apparatus 130 obtains the second image 1100, which is shown in FIG. 11 and represents ridges respectively as a boundary, by using a watershed algorithm or the like.

In operation S2720, the tire recognition apparatus 130 obtains a shortest path in which a weight value is taken into account, by applying a path search algorithm to a path such as a maze which consists of boundaries and is obtained by combining the second image 1100 with the first image 1000 and reflecting a weight value in the path In operation S2730, the tire recognition apparatus 130 converts the shortest path present in the linear image into a round image that is obtained before the linear image is obtained by conversion, and corrects a shortest path in the round image to have a form of a circle or an oval.

In operation S2740, the tire recognition apparatus 130 re-extracts a tire from the round image based on the circle or the oval generated by correcting the shortest path, and converts an image of the tire into a linear image.

Figure 28:
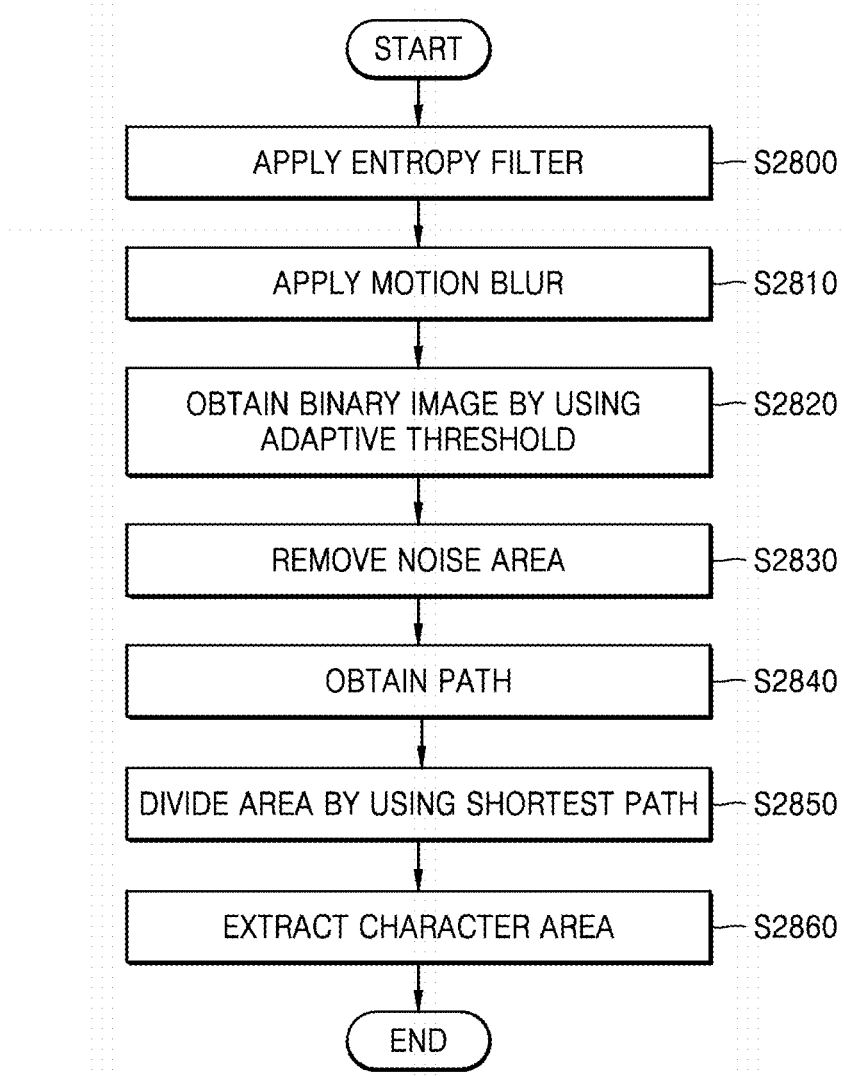
FIG. 28 is a flowchart of an example of a method of extracting a character area from a linear image.

FIG. 28 is a flowchart of an example of a method of extracting a character area from a linear image.

Referring to FIG. 28, in operations S2800 and S2810, the tire recognition apparatus 130 obtains a clear image by performing pre-processing such as an entropy filtering, motion blurring, or the like to the linear image. According to exemplary embodiments, the tire recognition apparatus 130 may perform one or more pre-processing processes or may not perform pre-processing.

In operation S2820, the tire recognition apparatus 130 converts the linear image, obtained after the pre-processing is completed, into a binary image consisting of black and white. The tire recognition apparatus 130 may obtain a binary image by applying an adaptive threshold to the linear image.

In operation S2830, the tire recognition apparatus 130 removes a noise area of the binary image from the binary image, that is, an area whose size is smaller than a predetermined size. An example of a state when noise is removed from the binary image is shown in FIG. 19.

In operation S2840, the tire recognition apparatus 130 obtains at least one 2010 or 2020 path connecting both ends of the binary image to each other, by applying a path search algorithm to the binary image from which noise is removed. Then, in operations S2850, the tire recognition apparatus 130 divides the linear image into at least one area by applying the at least one path 2010 or 2020, obtained as described with reference to FIG. 20, to the linear image.

Then, in operation S2860, the tire recognition apparatus 130 extracts an area of a character to be recognized, which includes a character, from each of the at least one area obtained by the dividing. Since, unlike a general paper document, black and white are not clearly distinguished from each other in a character area in a tire image, a character may not be recognized by applying a general character recognition algorithm. Accordingly, the tire recognition apparatus 130 determines an area where many edges are present as an area where a character is present, by taking into account that many edges are present in a periphery of a character, and extracts the area where many edges are present from each of the at least two area obtained by the dividing. as shown in FIGS. 23A and 23B, since an area between each character, for example, an area between 'M' and 'I' in a certain area where many edges are present is a plane area where an edge is not present, each character is distinguished from each other with reference the plane area, and thus, an area of a character to be recognized, divided according to each character, may be extracted.

Figure 29:
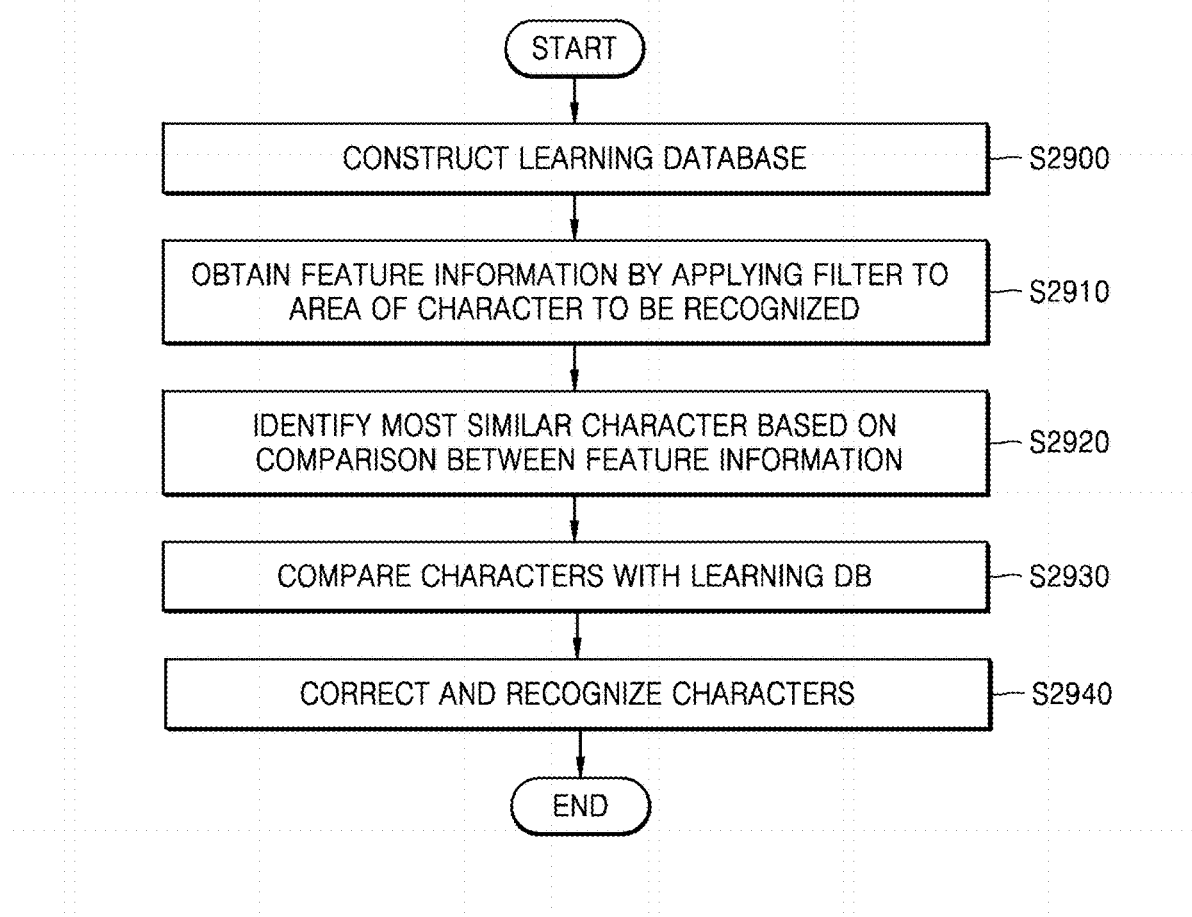
FIG. 29 is a flowchart of an example of a method of recognizing a character on a tire.
Figure 30:
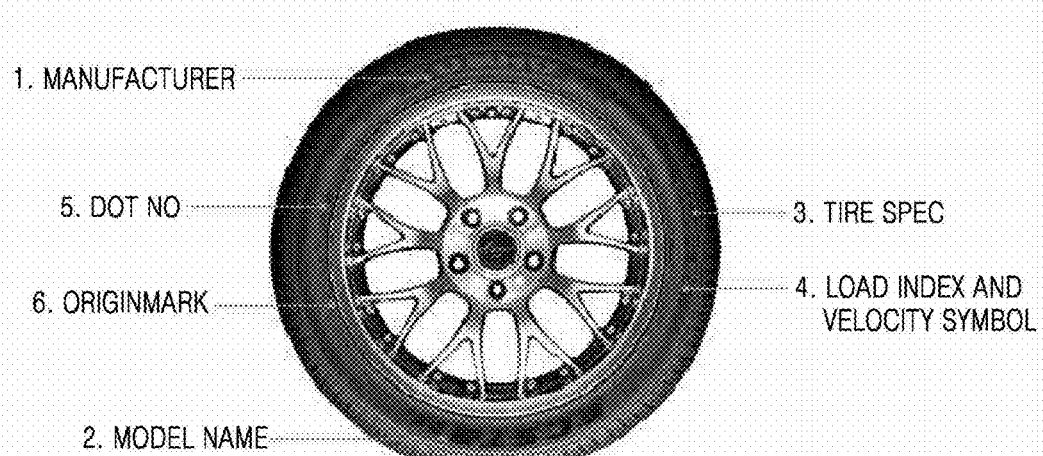
FIG. 30 illustrates an example of information shown on a side of a tire in a related art.

FIG. 29 is a flowchart of an example of a method of recognizing a character on a tire.

Referring to FIG. 29, in operation S2900, a learning database is constructed. The learning database store at least one piece of feature information which is obtained by applying at least one filter to an area for learning that includes each character extracted from an image of the tire.

In operation S2910, the tire recognition apparatus 130 obtains at least one piece of feature information by applying at least one predetermined filter to an area of a character to be recognized, which is extracted by analyzing an image received from a terminal. Then, in operation S2920, the tire recognition apparatus 130 compares the at least one piece of feature information about the area of the character to be recognized to feature information stored in the learning database according to each character for learning, and then, determines a character, which has feature information most similar to the feature information stored in the learning database, as a character in the area of the character to be recognized.

For example, if feature information about an area of a character to be recognized is similar to feature information about an area that includes a character 'A' for learning in the learning database, the tire recognition apparatus 130 determines that a character, which is present in the area of a character to be recognized, as 'A'.

However, one or more characters may not be accurately recognized due to abrasion or contamination of a tire. In this case, in operations S2930 and S2940, the tire recognition apparatus 130 compares a result obtained by recognizing characters in a particular area to a string pre-stored in the learning database, and thus, determine a string, most similar to the characters in the particular area, as characters that is present in a tire image received from a terminal.

For example, even though original characters in the tire image is 'MICHELIN', the tire recognition apparatus 130 may incorrectly recognize some characters as 'MIO ELIN' and may not recognize other characters. In this case, the tire recognition apparatus 130 determines a string 'MICHELIN' that is most similar to "MIO ELIN", from among strings pre-stored in the learning database, as characters included in the tire.

Unlike a general paper document, even though black and white are not clearly distinguished from each other on a side of a tire, the tire recognition apparatus 130 may recognize a character on the side of the tire. A user may easily obtain information about the tire by capturing an image of the side of the tire by using a smartphone or the like. Additionally, the tire recognition apparatus may easily perform a tire recognition process by providing a guideline for capturing an image of a tire.

Exemplary embodiments can also be embodied as computer-readable codes on a computer-readable recording medium. The computer-readable recording medium is any data storage device that can store data which can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope of the inventive concept as defined by the following claims.

What is claimed is:

1. A tire recognition method comprising:
 receiving an image of a round tire using a camera of a mobile device;
 converting, by the mobile device, the image of the round tire included in the image into a linear image of the round tire by:
  extracting, by the mobile device, the image of the round tire from the received image; and
  obtaining, by the mobile device, the linear image of the round tire by rearranging linear images in a same direction, wherein each of the linear images corresponds to at least one line that is perpendicular to a circumference of a circle or an oval corresponding to a wheel in the tire;
 extracting, by the mobile device, an area of a character to be recognized from the linear image;
 determining, by the mobile device, a character for learning, which is most similar to the extracted area of the character to be recognized from among a pre-constructed group of characters for learning, as a character in the area of the character to be recognized; and
 retrieving, by the mobile device, information associated with the round tire based on the character for learning.

2. The tire recognition method of claim 1, wherein the converting of the image of the round tire into the linear image further comprises:
 removing a wheel from the image of the round tire prior to obtaining the linear image.

3. The tire recognition method of claim 1, wherein extracting the image of the round tire comprises:
 extracting a certain area, which includes the round tire, from the received image of the round tire based on at least one guideline provided when the received image of the round tire was captured prior to obtaining the linear image.

4. The tire recognition method of claim 3, wherein the extracting of the area further comprises extracting a certain area located between two guidelines, which were provided when the received image was captured and have a diameter different from each other, from the received image.

5. The tire recognition method of claim 1, wherein:
the image of the round tire is extracted based on a guideline provided when the received image was captured;
converting the image further comprises:
obtaining a boundary between the round tire and a wheel based on intensity in the linear image;
extracting an additional image of the round tire from the received image based on the boundary; and
obtaining, by the mobile device, a new linear image of the round tire by rearranging new linear images from the extracted additional image in a same direction, wherein each of the new linear images corresponds to at least one line that is perpendicular to a circumference of a circle or an oval corresponding to a wheel in the tire.

6. The tire recognition method of claim 5, wherein the obtaining of the boundary between the wheel and the tire comprises:
providing a weight value to each line in the linear image according to a direction of a boundary of each respective line;
obtaining additional boundaries between each area which is divided based on intensity in the linear image; and
obtaining a shortest path connecting both ends of a path image, which consists of the additional boundaries between each area, to each other, by applying the weight value for each respective line.

7. The tire recognition method of claim 6, wherein the secondarily converting of the image comprises:
converting the shortest path into a round image;
correcting a shortest path in the round image to have a form of a circle or an oval;
re-extracting a tire in the received image based on the circle or the oval obtained by the correcting; and
obtaining, by the mobile device, a new linear image of the round tire by rearranging new linear images from the re-extracted tire in the received image in a same direction, wherein each of the new linear images corresponds to at least one line that is perpendicular to a circumference of a circle or an oval corresponding to a wheel in the tire.

8. The tire recognition method of claim 6, wherein the extracting of the area of a character to be recognized comprises extracting the character area from the linear image by using at least one feature from the group consisting of texture, a pattern, and an edge.

9. The tire recognition method of claim 1, wherein the extracting of the area of a character to be recognized comprises:
applying an entropy filter to the linear image;
obtaining a binary image consisting of black and white areas by using an adaptive threshold in an image obtained by applying the entropy filter to the linear image;
removing a noise area, whose size is smaller than a predetermined size, from the binary image; and
extracting an area of a character to be recognized from an image obtained by removing noise from the binary image.

10. The tire recognition method of claim 1, wherein the determining of the character for learning comprises:
obtaining feature information by applying at least one filter to the area of a character to be recognized; and
determining a character for learning as a character included in the area of a character to be recognized, the character for learning having feature information that is most similar to feature information about the area of a character to be recognized, based on comparison between pre-constructed feature information stored within a database and the feature information about the area of a character to be recognized.

11. The tire recognition method of claim 10, wherein the at least one filter is a filter that may extract a feature, such as a Haar-like filter or a gabor filter.

12. A non-transitory computer-readable recording storage medium having recorded thereon a computer program which, when executed by a computer, performs the method of claim 1.

* * * * *